(12) United States Patent
Parkman

(10) Patent No.: US 6,757,535 B2
(45) Date of Patent: Jun. 29, 2004

(54) SYSTEM AND METHOD FOR PROVIDING NETWORK ADDRESSES TO MOBILE PLATFORMS

(75) Inventor: David S. Parkman, Mercer Island, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 10/167,019

(22) Filed: Jun. 11, 2002

(65) Prior Publication Data

US 2003/0045232 A1 Mar. 6, 2003

Related U.S. Application Data

(60) Provisional application No. 60/316,457, filed on Aug. 31, 2001.

(51) Int. Cl.[7] ................................................ H04B 7/00
(52) U.S. Cl. ...................... 455/431; 455/427; 370/312
(58) Field of Search ............................ 455/431, 427, 455/428, 432.2, 435.2, 13.2; 370/324, 349, 382, 383, 392, 312

(56) References Cited

U.S. PATENT DOCUMENTS 6,353,734 B1 * 3/2002 Wright et al. ................. 455/98
6,603,763 B1 * 8/2003 Koshino ...................... 370/389

FOREIGN PATENT DOCUMENTS

| EP | 0 890 907 A | 1/1999 | |
|---|---|---|---|
| WO | WO 97 20413 A | 6/1997 | |
| WO | WO 00 13339 A | 3/2000 | |
| WO | WO 00/14987 | 3/2000 | |
| WO | Wo 00/13339 * | 5/2000 | ........... H04B/7/185 |

OTHER PUBLICATIONS

International Search Report (Feb. 28, 2003) International Application No. PCT/US 02/25638, 4 pages.
Losquadro , G.: "Abate: Aeronautical Satellite Communications for on Multimedia Services"; European Conference on Satellite Communications; Nov. 18, 1997, pp. 7/1–7/7 (XP008002678).

* cited by examiner

*Primary Examiner*—Nick Corsaro
(74) *Attorney, Agent, or Firm*—Harness Dickey & Pierce P.L.C.

(57) ABSTRACT

A system and method for assigning network addresses to mobile platforms using a satellite communications link. The network address information is transmitted from a ground station only upon request by the mobile platform, with the mobile platform transmitting a confirmation signal after receiving the network address information. Bi-directional communication is thereby provided between the ground system and specific mobile platforms. The network address information is maintained on-board the mobile platform within a plurality of components to avoid losing the information in the event of a failure of one or more on-board components operating on a network on the mobile platform.

28 Claims, 4 Drawing Sheets

SYSTEM AND METHOD FOR PROVIDING NETWORK ADDRESSES TO MOBILE PLATFORMS

CROSS-REFERENCE TO RELATED APPLICATIONS

This application claims priority from U.S. provisional application Serial No. 60/316,457, filed Aug. 31, 2001.

FIELD OF THE INVENTION

The present invention relates generally to bi-directional electronic communication systems, and more particularly to a system and method for assigning unique network addresses to mobile platforms for use in bi-directional communications between the mobile platforms and a satellite system.

BACKGROUND OF THE INVENTION

In order to communicate within or between networks, a transmitting device must be able to determine a particular network address associated with a receiving device in order to transmit data to that receiving device. The transmitting device also must have a network address in order for the network to determine the data route for a particular transmission. The address may be a unique static address or may be a dynamically assigned address. However, regardless of the manner of assignment of the network address, it is typically used to specifically identify a particular network, and usually a specific device within the network.

Various types of network address may be provided, including for example, an Internet address, a home page address or an email address. Typically, switches and routers use the network address to transmit data (e.g., data packets) to the destination network address. For example, an Internet Protocol (IP) address specifically identifies the source and destination of data transmitted, which data is typically provided as data packets across networks. The IP address may include a network address portion and a specific device address portion. Thus, in operation, switches select the data paths for transmitting data packets to their destination with routers determining the next network point to which the data packets should be transmitted.

Without a proper address, such as an IP address, devices are unable to determine the destination for specific data packets and are unable to transmit that data. Therefore, each device that sends and receives data within a network is assigned a network address in order for it to be recognized within the network, as well as outside the network (i.e., for providing the necessary address information to transmit data to and receive data from that device).

Network addresses, and more particularly, IP addresses, may be assigned in various ways. One way is for the information technology (IT) department or information services (IS) department of an organization to assign each computer within that organization a specific IP address, with an individual loading the information onto each computer. This occurs on-site with the IP address of each computer configured at the time of installation and/or upon reformatting of the computer (e.g., after a computer is reset because of network of other connection problems). Alternately, the computers may be configured such that IP addresses are assigned dynamically when needed for electronic communication (e.g., when accessing the Internet using a network server).

Sometimes it is desirable to remotely assign a network address to a device. For example, an Internet Service Provider (ISP) constantly identifies user logins in order to dynamically assign IP addresses to the computers or other electronic devices of individuals using, for example, landlines (e.g., dial-up with a modem) to dial into the ISP network. The ISP can directly establish a connection between the user's computer and the ISP network in order to obtain access to the Internet using the landline on which the user dialed in. Thus, the ISP is able to easily identify the connection path of the user and assign an IP address because the user is stationary and accessing the ISP using a specific telephone landline.

A problem occurs when the location of the user is not known, for example, if the user attempts to login remotely or wirelessly while in-transit. When in-transit, the location of the user may have to be determined in order to establish an initial communication link and assign an IP address for bi-directional network communication. An additional problem associated with logging in while in-transit is the cost of connecting to a network system. When communicating electronically while in-transit (e.g., using a satellite system), the cost for that connection (i.e., bandwidth) is extremely high. For example, because the available bandwidth is substantially less when using a satellite communication than when using a ground-based communication system, the cost of transmitting data is much higher. Presently, the cost of satellite communication may exceed 1000 times the cost of ground-based communication. Thus, even a small increase in the efficiency at which an in-transit user can be identified and assigned an IP address, which reduces the bandwidth usage needed to assign that network address, will result in enormous cost savings. This is particularly true as the number of in-transit users increases.

SUMMARY OF THE INVENTION

The present invention provides a system and method for assigning a unique network address (e.g., IP address) to a mobile platform, thereby providing for differentiation between each mobile platform during bi-directional electronic communications. Once an IP address is assigned, unicast messages may be transmitted to a specific mobile platform having an assigned IP address.

In one preferred embodiment, a ground system assigns a unique subnet address to each mobile platform at the time of the activation of an electronic communication system on-board the mobile platform, or upon initial installation and/or upon replacement of equipment (e.g., due to equipment failure) requiring the IP address. This eliminates the need for a maintenance person to load this data onto the equipment, thereby reducing the chance of the maintenance person incorrectly entering part of the IP address. It also reduces cost by eliminating the need for training individuals on how to configure the equipment with the IP address, as well as the manual operation of configuring the equipment.

Upon initial activation of a communication system on-board a mobile platform requiring an IP address, the ground system typically is not able to transmit a unicast signal to the communication system equipment within the mobile platform because the IP address is not assigned. In one embodiment of the present invention, IP address information is embedded into a polling signal that is multicast to all mobile platforms (e.g., aircrafts) using a forward communication path. Because the systems on-board the mobile platforms are not yet configured, and thus unable to establish a return communication path because no IP address is assigned, each of the mobile platforms will receive the embedded information before it is required for use. More preferably, the present invention is configured such that a signal containing the IP address for a particular mobile platform is not transmitted until the mobile platform requests the IP address from a ground system.

The signal having the IP address therein is multicast to mobile platforms (e.g., aircrafts) within a coverage region of the satellites used by the ground system, and includes other information, including specifically a mobile platform code or identifier for use by the mobile platform requesting the IP address to identify the particular multicast signal containing its network address. Upon receiving the signal assigning the IP address, the mobile platform preferably transmits a confirmation signal using the assigned address.

The invention preferably also provides for copying or mirroring the assigned IP address information to other equipment or components on-board the mobile platform (e.g., servers and antennas). Thus, even if a data transmitter/receiver on the mobile platform fails and must be replaced, upon activation of the replacement equipment, the assigned IP address may be obtained from the other on-board equipment. This further minimizes the possibility of having to transmit IP address information after the initial IP address assignment.

A more preferred IP address information signal contains the assigned network address and a subnet mask. This provides for communication with specific equipment on-board the mobile platform. For example, the ground system will then be able to unicast data directly to specific equipment (e.g., a server) on-board the mobile platform using a satellite system.

Thus, the present invention provides an efficient system and method for assigning IP addresses to mobile platforms communicating with a satellite system by identifying the specific mobile platform requiring an IP address assignment. By reducing the bandwidth-requirement for assigning the IP addresses, cost is reduced. Mirroring the information to other equipment on-board the mobile platform also reduces the risk of having to re-transmit IP address assignment information after the initial transmission.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. Thus, although the application of the present invention as disclosed herein is generally directed to an aircraft environment and assigning IP addresses to systems within the aircrafts, it is not so limited and any type of network address may be assigned to any mobile platform (e.g., train, cruise ship, bus, automobile, etc.) according to the principles of the present invention.

Figure 1:
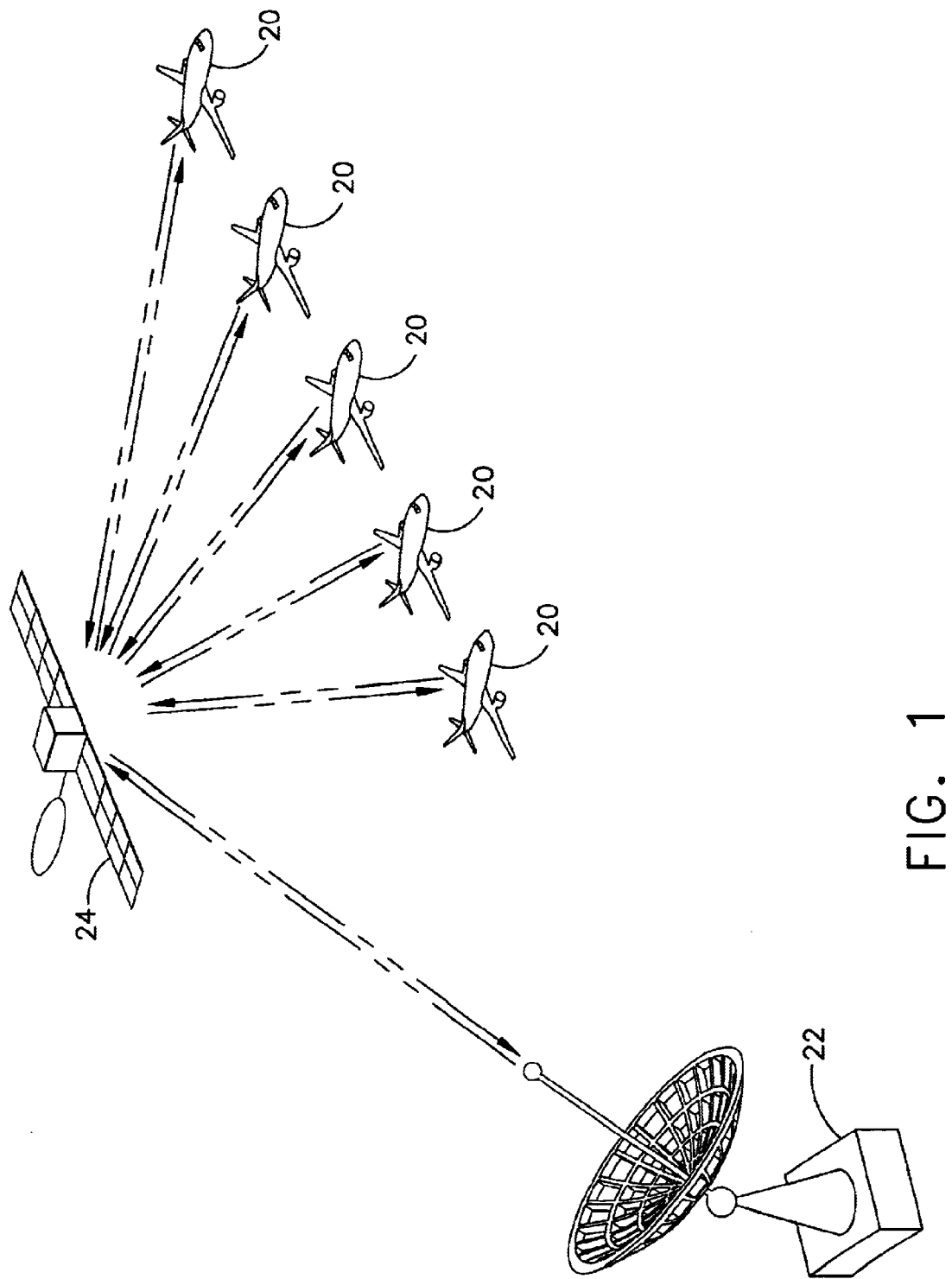
FIG. 1 is a simplified block diagram showing bi-directional communication between a ground system and a plurality of mobile platforms.

Referring to FIG. 1, the present invention provides for assigning IP addresses to a plurality of mobile platforms 20, shown as aircrafts, to allow bi-directional directional communication between a ground system 22 and the mobile platforms 20 using a satellite system 24. As shown therein, forward communication links or paths 26 from the ground system 22 to the mobile platforms 20 and return communication links or paths 28 from the mobile platforms 20 to the ground system 22 are provided.

Generally, the present invention provides for transmitting IP address assignment information from the ground system 22 to the mobile platforms 20 using the forward communication paths 26. Once the mobile platforms 20 receive the IP address information, the return communication paths 28 may be established for providing bi-directional unicast communication between the ground system 22 and each of the mobile platforms 20 having an assigned IP address.

Figure 2:
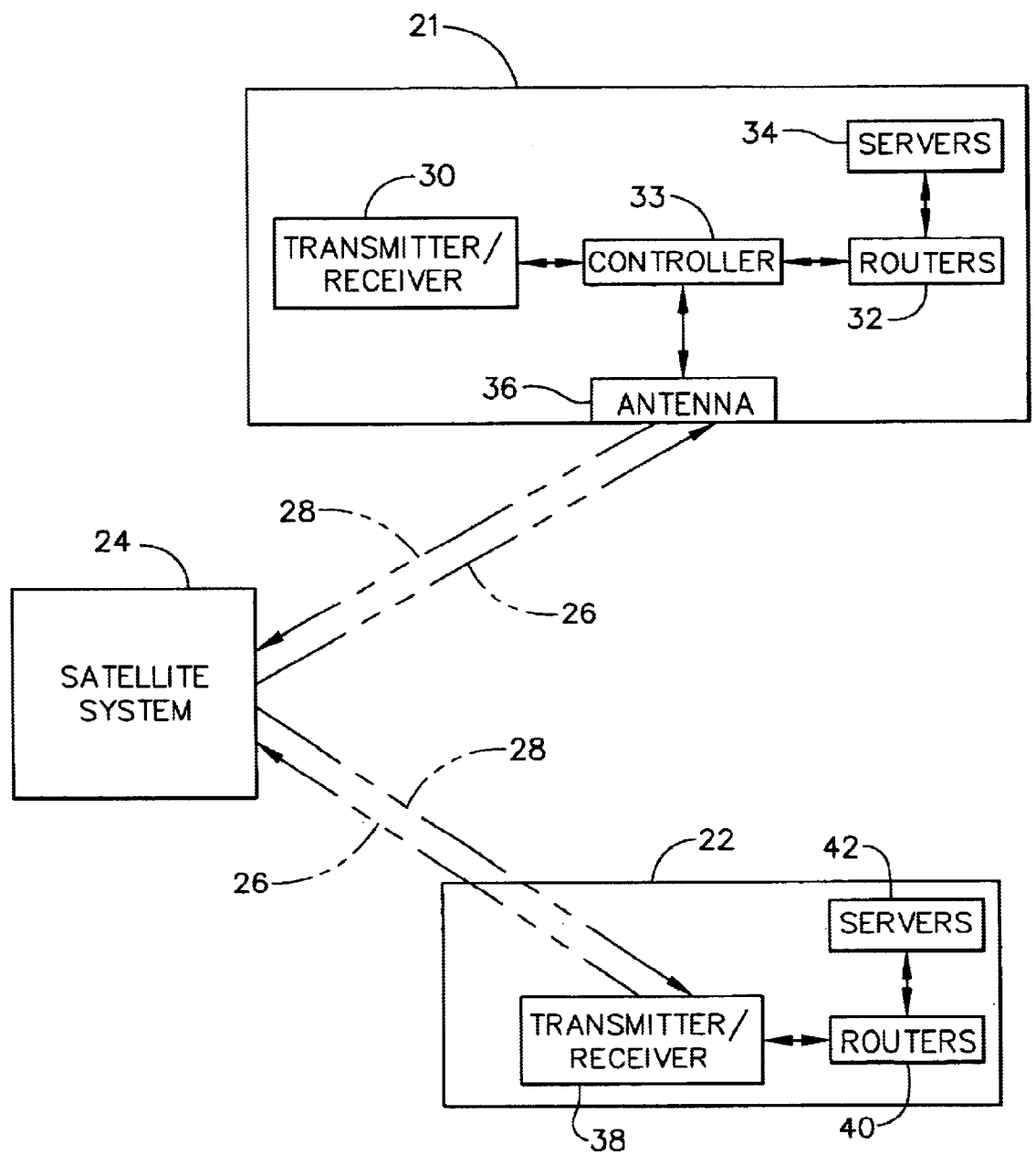
FIG. 2 is a block diagram showing a system for transmitting a network address constructed according to the principles of the present invention.

Specifically, and as shown even more clearly in FIG. 2, each mobile platform 20 includes a communications system 21 having transmitter/receiver 30, on-board routers 32, on-board servers 34 and an antenna 36. The ground system 22 includes a transmitter/receiver 38, routers 40 and servers 42. In operation, communication between the ground system 22 and the mobile platforms 20 is provided via a satellite system 24. Communication from the ground system 22 to the mobile platform 20 is provided using the forward communication path 26 and communication from the mobile platform 20 to the ground system 22 is provided using the return communication path 28.

Figure 3:
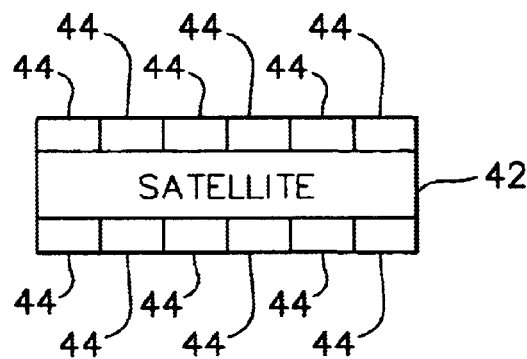
FIG. 3 is a simplified block diagram of a single satellite in a satellite system as shown in FIG. 2.

The satellite system 24 is preferably provided with a plurality of satellites, and as shown in FIG. 3, each satellite 42 preferably includes a plurality of transponders 44 for providing bi-directional "bent-pipe" communication between the ground system 22 and the mobile platforms 20. It should be noted that preferably more than one transponder 44 provides communication between the ground system 22 and a specific mobile platform 20. More preferably, bi-directional communication is provided between the ground system 22 and a specific mobile platform 20 with any one of a predetermined plurality of four transponders 44.

In one preferred embodiment of the present invention, the ground system 22 transmits IP address assignment information embedded in a polling signal to the mobile platforms 20. The polling signal is multicast to all mobile platforms 20 at a specified time interval (e.g., every 5 seconds). The polling signal preferably includes a return link assignment message that comprises an aircraft identification code and designated return channel information This information could comprise information regarding the use of specific transponders 44 for communicating with the ground system 22 using the return communication path 28, in addition to the IP address assignment.

Each mobile platform 20 is preferably assigned a different aircraft identification number such that the transmitter/ receiver 30 on-board each mobile platform 20 is configured to recognize its aircraft identification number and receive transmitted data or information containing that number. The polling signal is multicast using the satellite system 24, which provides that all mobile platforms 20, including each mobile platform 20 that does not have an IP address assignment, and which will need a network address assignment in order to establish a return communication link or path 28, can receive the signal. The mobile platform 20 associated with the aircraft identification number contained within the polling signal receives the signal to obtain the IP address assignment data contained therein.

Figure 4:
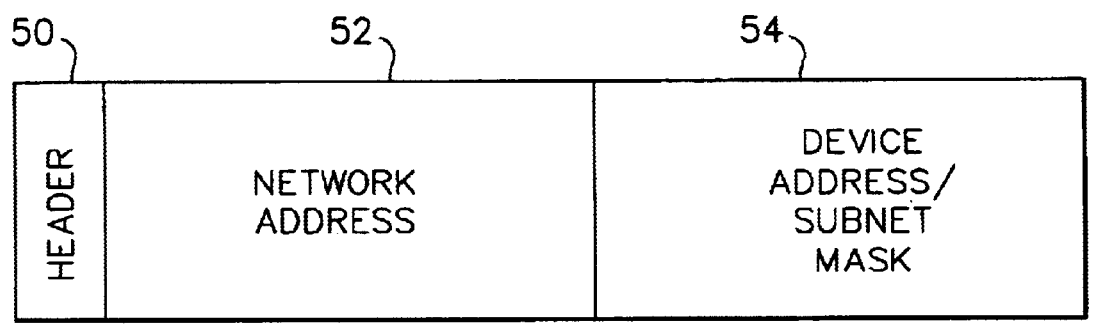
FIG. 4 is a block diagram of network address information transmitted using the system in FIG. 2.
Figure 5:
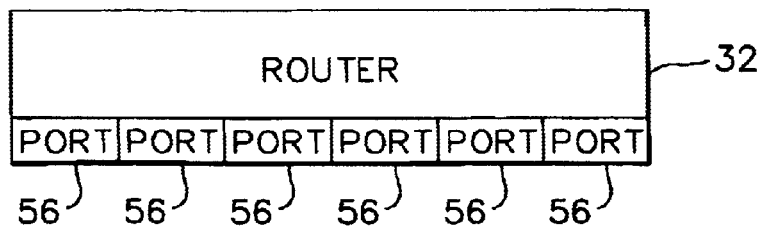
FIG. 5 is a simplified block diagram of a router of the system in FIG. 2.

As shown in FIG. 4, the IP address assignment information or data 48 preferably includes a header 50, a network address portion or segment 52 and a device address or subnet mask (address) portion or segment 54. The routers 32 on the mobile platforms 20 use this address information to route data on the network within the mobile platform 32 using, for example, the servers 34. The routers 32, as shown in FIG. 5, preferably include a plurality of configurable ports 56 that use the subnet address information 54 to determine port assignments for communicating with other on-board devices. For example, passengers within an aircraft may connect to interfaces for communicating with the servers 34 to access information from the World Wide Web. Port assignments are needed to manage data traffic flow on-board the aircraft and for communicating with the ground system 22.

The address assignment information 48 is more preferably a private assignment within a particular network, with public IP addresses (e.g., for use in communicating with the World Wide Web) assigned dynamically in a known manner. However, it should be noted that the address assignment information may be a public address assignment.

Referring again to FIG. 2., the IP address assignment information 48 received by the on-board transmitter/receiver 30 is provided (e.g., copied or mirrored) to the other components on-board the mobile platform 20 using a controller 33. Specifically as shown therein, the IP address assignment information 48 is provided to the antenna 36, routers 32 and servers 34, each of which preferably includes a storage device for storing the assignment information. This minimizes the possibility that once received, the IP address assignment information 48 will have to be retransmitted from the ground system 22. It should be noted that the IP address assignment information 48 may be provided to any component on-board the mobile platform 20 that has a permanent data storage or memory. The IP address assignment information 48 is maintained on-board the mobile platform 20 (i.e., stored within other components) even if individual equipment or components are replaced or updated.

Figure 6:
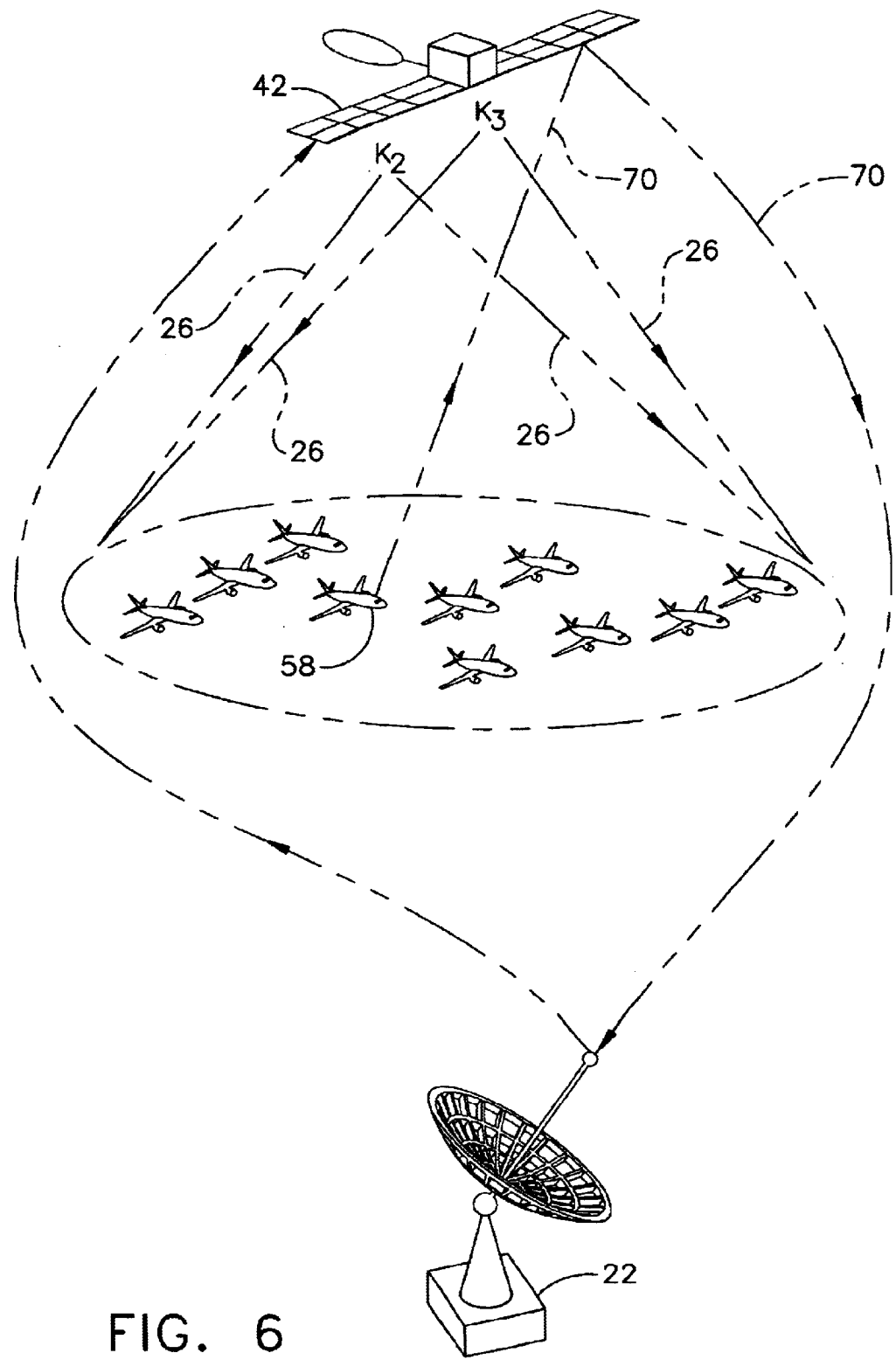
FIG. 6 is simplified diagram showing the assignment of a network address to a mobile platform according to the present invention.

A particularly preferred embodiment for assigning IP addresses to mobile platforms 20 is shown in FIG. 6. With this embodiment, a specific mobile platform 20 (e.g., an aircraft 58), upon installation of an on-board system requiring a satellite communication link (e.g., for use on-board to access the Internet), transmits a request signal 70 for an IP address assignment to a ground system 22. As shown in FIG. 2, a transmitter/receiver 30 in combination with an antenna 36 may be provided on-board the mobile platform 20 to transmit the request signal. Upon receiving the request signal, the ground system 22 determines an IP address assignment based upon the communication system requirements. The ground system 22 then transmits the address assignment information 48 to a satellite 42 for multicasting to the mobile platforms 20 using the forward communication paths 26 as shown in FIG. 6.

As described herein, the address assignment information 48 is preferably provided in combination with other information, including an aircraft identification number allowing the requesting aircraft to identify and receive its requested IP address information 48. Upon receiving the IP address information 48, a confirmation signal is preferably transmitted from the mobile platform 20 to the ground system 22 indicating that the address assignment information 48 was received. This confirmation signal may be transmitted along a return communication path 28 using the assigned IP address. Thus, bi-directional communication is provided between the mobile platform 20 and the ground system 22 based upon the IP address information 48. Thereafter, unicast transmissions from the ground system 22 to a particular mobile platform 20 are provided.

It should be noted that the transmission of the requested IP address information 48 from the ground system 22 to the mobile platform 20 may be provided as part of a polling signal. Alternatively, it may also be provided as a stand-alone signal or in combination with another signal from the ground system 22 depending upon the particular ground system 22 requirements. Also, the return confirmation signal from the mobile platform 20 to the ground system 22 may be a stand-alone signal or may be provided in combination with another signal transmitted from the mobile platform 20. It should further be noted that the IP address information 48 is preferably transmitted using more than one satellite transponder 44, and more preferably four transponders 44. However, transmission of IP address information 48 may be provided using only one transponder 44.

Thus, using the present invention, IP address assignment information is transmitted once to a plurality of mobile platforms only on demand. The available bandwidth for use in communicating with other mobile platforms or for other communication needs is therefore increased and the communications cost is decreased.

Although the present invention has been described in connection with mobile platforms 20, each having a transmitter/receiver 30, routers 32, servers 34 and an antenna 36 in bi-directional communication with a ground system 22 via a satellite system 24, it should be appreciated that different or additional components may be provided as part of the mobile platform 20, the ground system 22 and the satellite system 24. This may include, for example, different server and communication path configurations. Thus, the transmission of IP address assignment information may be provided in connection with other systems that are implemented and configured according to the requirements of the particular mobile platforms. Further, the specific IP address information provided to the mobile platforms may be modified according to the needs of the system.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for assigning a network address to a mobile platform for use in providing bi-directional communication with the mobile platform via at least one satellite, the system comprising:

a ground-based system having a transmitter for transmitting to a plurality of mobile platforms via the satellite a unique network address assigned to one of the plurality of mobile platforms requesting the unique network address; and a communications system comprising:
- a receiver provided on-board each of the plurality of mobile platforms for receiving the unique network address from the ground-based system via the satellite assigned to the requesting mobile; and
- at least one server and at least one antenna, each having a storage member for storing the unique network address.

2. The system according to claim 1 wherein the communications system further comprises a transmitter for transmitting the request for a unique network address via the satellite; wherein the ground based system further comprises a ground-based receiver adapted for receiving the request from the mobile platform via the satellite.

3. The system according to claim 2 wherein the bi-directional communication is provided via a forward communication path and return communication path, and the ground-based transmitter is configured for multicast transmission of a signal having the unique network address and a mobile platform identifier via the forward communication path.

4. The system according to claim 3 wherein the mobile platform is an aircraft with the identifier uniquely identifying a specific aircraft, and the on-board receiver of the specific aircraft is adapted to recognize and receive the signal from the ground-based transmitter having the identifier associated with the specific aircraft.

5. The system according to claim 3 wherein the satellite comprises a plurality of transponders and wherein the ground-based transmitter transmits the signal using at least one transponder.

6. The system according to claim 1, wherein the communications system further comprises a controller for communicating the unique network address to at least one of the server and antenna.

7. The system according to claim 2 wherein the on-board transmitter is configured to transmit the request for a unique network address only when the unique network address is not otherwise available from at least one of storage members.

8. The system according to claim 3 wherein the unique network address comprises an Internet protocol address having a network address portion and a subnetwork address portion.

9. The system according to claim 8 wherein the ground-based transmitter is configured for transmitting data to specific components on-board the mobile platform based upon the unique network address assigned to the mobile platform.

10. The system according to claim 9 wherein the signal having the unique network address comprises additional data relating to bi-directional communication with the mobile platform, and the unique network address is configured for transmission with the additional data.

11. The system according to claim 2 wherein the on-board transmitter is configured to automatically transmit the request for a unique network address upon initial activation.

12. The system according to claim 1 wherein the ground-based transmitter further comprises a router for controlling the transmission of data to the on-board receiver of the mobile platform based upon the unique network address assigned to the mobile platform.

13. The system according to claim 2 wherein the on-board transmitter is adapted to transmit a confirmation signal indicating the reception of the unique assigned network address.

14. The system according to claim 13 wherein the confirmation signal comprises further communication control data relating to bi-directional communication via the satellite.

15. The system according to claim 1 wherein the ground based transmitter is adapted to transmit a plurality of unique network addresses, each assigned to a specific one of a plurality of mobile platforms.

16. The system according to claim 1 wherein the ground-based transmitter is adapted to transmit the unique network address a plurality of times.

17. The system according to claim 13 wherein the ground-based transmitter is adapted to continue to transmit the unique network address at predetermined time intervals until the confirmation signal is received by the groundbased receiver.

18. A method for assigning a unique network address to a mobile platform for use in communicating with the mobile platform via a satellite system, the method comprising the steps of:
- using a transmitter of a ground-based system to transmit at least one unique network address via the satellite system to a plurality of mobile platforms with at least one of the plurality of mobile platforms requesting the unique network address;
- using a receiver on-board each of the mobile platforms to receive the unique network address, each of the receivers adapted to recognize the unique network address assigned to its associated said mobile platform requesting the unique network address; and
- storing the unique network address in a storage member of at least one of a server and an antenna on board the associated mobile platform.

19. The method according claim 18 further comprising the steps of:
- using a transmitter on-board each of the mobile platforms to transmit a request for the unique network address to the ground-based system; and
- using a receiver of the ground-based system to receive the requests for the unique network address.

20. The method according to claim 19 further comprising processing the request for the unique network address to determine the unique network address for the requesting mobile platform.

21. The method according to claim 19 wherein the unique network address comprises a mobile platform identifier and the step of using the ground-based system to transmit the unique network address further comprises multicasting the unique network address one time after the request for the unique network address has been received.

22. The method according to claim 21 wherein the step of using a transmitter on-board the mobile platforms further comprises transmitting a confirmation signal indicating reception of the unique network address by the receiver on-board the mobile platform associated with the mobile platform identifier.

23. The method according to claim 22 wherein the step of using the ground-based system to transmit the unique network address further comprises multicasting the unique network address a plurality of times at predetermined intervals until the confirmation signal is received by the receiver of the ground-based system.

24. The method according to claim 18 wherein the unique network address comprises a mobile platform identifier and the step of using a transmitter of the ground-based system to transmit the unique network address further comprises multicasting the address a plurality of times.

25. The method according to claim 18 where the step of using a transmitter of the ground-based system to transmit the unique network address further comprises transmitting a sub-network address as part of the unique network address.

26. The method according to claim 18 wherein the satellite system comprises at least one satellite having a plurality of transponders and further comprising the step of using at least one transponder to transmit the unique network address.

27. A method for transmitting a signal having network address assignment data from a stationary transmitter to a receiver on-board a mobile platform, the method comprising the steps of:

using the stationary transmitter to transmit the signal to a satellite system for multicasting to a plurality of mobile platforms, the signal including a mobile platform identifier;

using the receiver on-board the mobile platform associated with the mobile platform identifier to receive the signal; and providing the network address assignment data to a storage element of at least one of a server and an antenna on-board the mobile platform.

28. The method according to claim 27 further comprising the step of using a transmitter on-board the mobile platform to request a network address assignment before using the stationary transmitter to transmit the signal.

\* \* \* \* \*